US012711672B2

(12) United States Patent
Gómez Bruballa et al.

(10) Patent No.: US 12,711,672 B2
(45) Date of Patent: Aug. 18, 2026

(54) MODERATED GENERATIVE IMAGE MODEL TRAINING

(71) Applicant: Shutterstock, Inc., New York, NY (US)

(72) Inventors: Raúl Gómez Bruballa, Dublin (IE); Alessandra Sala, Dublin (IE)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 18/638,017

(22) Filed: Apr. 17, 2024

(65) Prior Publication Data

US 2025/0329060 A1 Oct. 23, 2025

(51) Int. Cl.
*G06T 11/00* (2026.01)
*G06V 10/774* (2022.01)
*G06V 20/70* (2022.01)

(52) U.S. Cl.
CPC ............ *G06T 11/00* (2013.01); *G06V 10/774* (2022.01); *G06V 20/70* (2022.01); *G06V 2201/10* (2022.01)

(58) Field of Classification Search
CPC ...... G06T 11/00; G06V 10/774; G06V 20/70; G06V 2201/10
See application file for complete search history.

(56) References Cited

U.S. PATENT DOCUMENTS 10,962,939 B1 * 3/2021 Das ..................... G06F 16/3344
11,423,265 B1 * 8/2022 Chen ....................... G06T 11/00
11,995,803 B1 * 5/2024 Karpman .................. G06T 5/70
12,321,831 B1 * 6/2025 Karpman ............... G06N 20/00
2017/0098255 A1 * 4/2017 Miller ..................... G06F 16/71
2017/0269819 A1 * 9/2017 Pinpin ................... G06F 21/629
2019/0012568 A1 * 1/2019 Kumar ..................... G06N 5/02
2020/0210764 A1 * 7/2020 Hamedi ............... G06V 10/776
2021/0117736 A1 * 4/2021 Merler ..................... G06N 5/04
2022/0114361 A1 * 4/2022 Kale ...................... G06N 3/045
2023/0394855 A1 * 12/2023 Xie ......................... G06F 40/40
(Continued)

FOREIGN PATENT DOCUMENTS

CN 115238118 A * 10/2022 ......... G06F 16/5846

OTHER PUBLICATIONS

Sarridis et al., "Leveraging Large-scale Multimedia Datasets to Refine Content Moderation Models", 2022 IEEE Eighth International Conference on Multimedia Big Data (BigMM), p. 125-132 (Year: 2022).*
(Continued)

*Primary Examiner* — Daniel F Hajnik
(74) *Attorney, Agent, or Firm* — McDermott Will & Schulte LLP

(57) ABSTRACT

A method for training a generative image model includes receiving training data having training images and image captions and annotating the training data resulting in annotated training data having the training images, the image captions, and moderation labels, such that each training image is associated in the annotated training data with a corresponding image caption and at least one corresponding moderation label. The method further includes performing a training process to train a generative image model using the training images, the image captions, and the moderation labels, resulting in a trained model that generates images conditioned to both the image captions and the moderation labels.

20 Claims, 8 Drawing Sheets

(56) References Cited

U.S. PATENT DOCUMENTS

| | | | | |
|---|---|---|---|---|
| 2024/0221091 | A1* | 7/2024 | Dey | G06N 5/022 |
| 2025/0231675 | A1* | 7/2025 | Ishida | G06F 40/186 |

OTHER PUBLICATIONS

Brack, Manuel, et al. "Mitigating inappropriateness in image generation: Can there be value in reflecting the world's ugliness?. " arXiv preprint arXiv:2305.18398 (2023). (Year: 2023).*

EPO—International Search Report and Written Opinion for corresponding Int'l. Appln. No. PCT/US25/24129, mailed on Jun. 16, 2025, 10 pages.

Dong, Z., et al., "DreamArtist: Towards Controllable One-Shot Text-to-Image Generation via Positive-Negative Prompt-Tuning", arXiv.org, Apr. 5, 2023 (Apr. 5, 2023), pp. 1-10, XP093282407, DOI: 10.48550/ARXIV.2211.11337 Retrieved from the Internet: URL:https://doi.org/10.48550/arXiv.2211.11 337 [retrieved on May 30, 2025].

* cited by examiner

100

MODERATED GENERATIVE IMAGE MODEL TRAINING

TECHNICAL FIELD

The present disclosure generally relates to generative image models, and more particularly to training of moderated image generative models.

BACKGROUND

Generative artificial intelligence (AI) has been used for image generation using a text-based prompt. However, image moderation to avoid showing certain types of visual content (including, but not limited to, nudity, drugs, smoking, etc.) is difficult to enforce with current techniques.

One technique used to enforce moderation of image generation is background processing of the prompt. However, this is not universally effective since a user can evade the processing using prompt engineering. As an example, if "dressed" is added to the prompt, or "nude" used as a negative prompt, a user could still push image generation towards nudity by emphasizing it in the prompt. If "nude" (and a set of forbidden terms) are removed from user prompts, a user could still obtain images with nudity by finding terms and synonyms outside the forbidden vocabulary.

Another technique to enforce moderation of image generation is filtering the training data to remove images with undesired content. However, filtering out images from the training set may result in a loss of quality. As an example, when images containing nudity are removed from training data sets, image generation models are known to generate significantly worse human images.

As such, there is a need for improved techniques for moderation of image generation models that do not rely on prompt processing or filtered training data.

SUMMARY

According to some embodiments, a method for training a generative image model includes receiving training data including training images and image captions and annotating the training data resulting in annotated training data including the training images, the image captions, and moderation labels, such that each training image is associated in the annotated training data with a corresponding image caption and at least one corresponding moderation label. The method further includes performing a training process to train a generative image model using the training images, the image captions, and the moderation labels, resulting in a trained model that generates images conditioned to both the image captions and the moderation labels.

According to some embodiments, a non-transitory computer-readable medium stores a program for training a generative image model, which when executed by a computer, configures the computer to receive training data including training images and image captions, and to annotate the training data resulting in annotated training data including the training images, the image captions, and moderation labels, such that each training image is associated in the annotated training data with a corresponding image caption and at least one corresponding moderation label. The executed program further configures the computer to perform a training process to train a generative image model using the training images, the image captions, and the moderation labels, resulting in a trained model that generates images conditioned to both the image captions and the moderation labels.

According to some embodiments, a system for training a generative image model includes a processor and a non-transitory computer readable medium storing a set of instructions, which when executed by the processor, configure the processor to receive training data including training images and image captions, and to annotate the training data resulting in annotated training data including the training images, the image captions, and moderation labels, such that each training image is associated in the annotated training data with a corresponding image caption and at least one corresponding moderation label. The executed instructions further configure the processor to perform a training process to train a generative image model using the training images, the image captions, and the moderation labels, resulting in a trained model that generates images conditioned to both the image captions and the moderation labels. The executed instructions further configure the processor to provide a first input to the trained model, the first input including a description of a desired image, and to provide a second input to the trained model, the second input including a moderation label. The executed instructions further configure the processor to receive as an output from the trained model in response to the first input and the second input, an output image that (1) includes image content that matches at least part of the description of the desired image and (2) omits image content that matches the moderation label.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

Figure 1:
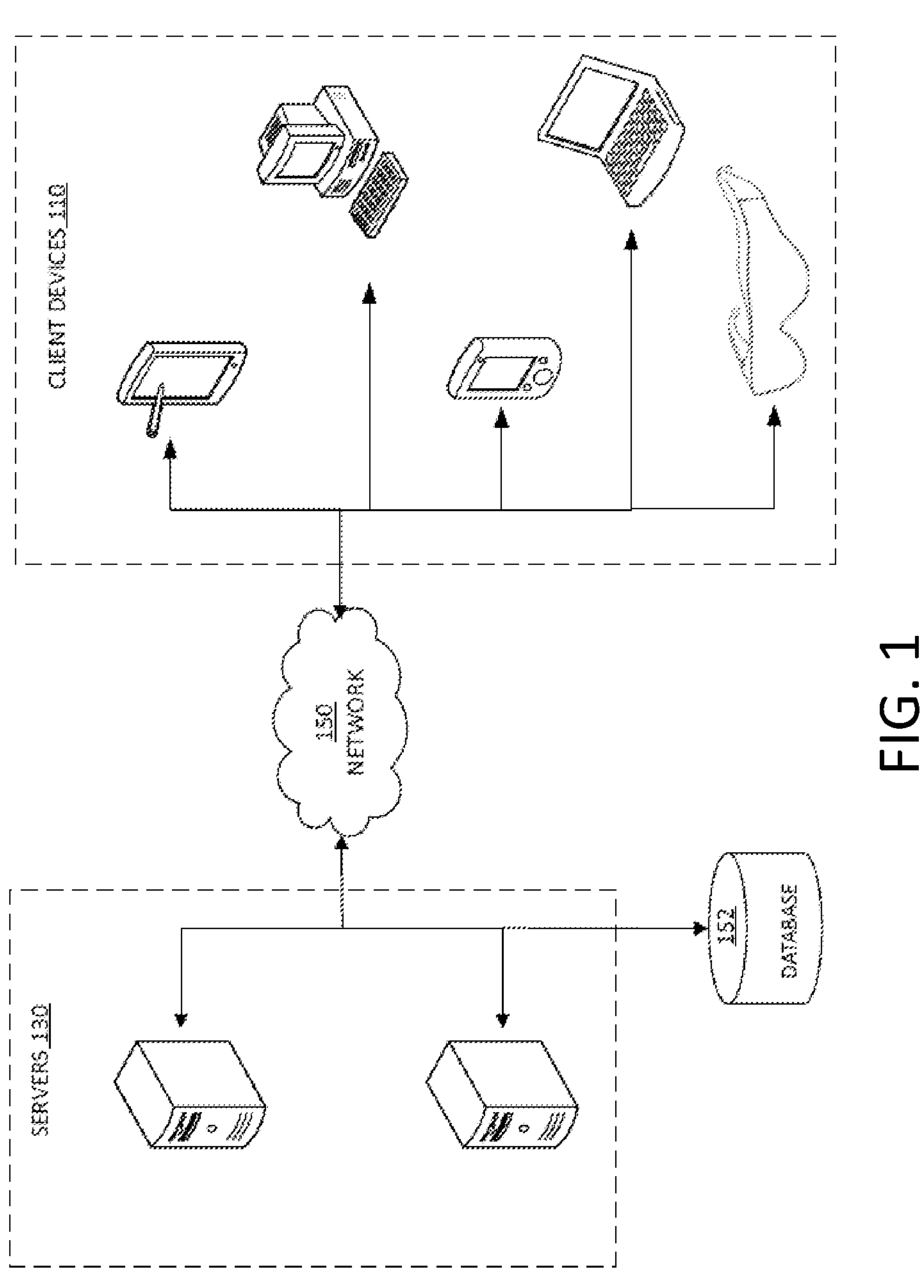
FIG. 1 illustrates a network architecture used to implement generative image model training, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

All references cited anywhere in this specification, including the Background and Detailed Description sections, are incorporated by reference as if each had been individually incorporated.

The term "generative image models" as used herein refers, in some embodiments, to artificial intelligence-based (AI) and/or machine learning (ML) models designed to generate high-quality images based on text or image inputs. These models employ various techniques including, but not limited to, diffusion models, latent diffusion models, generative adversarial networks (GANs), variational autoencoders (VAEs), autoregressive models, and transformer-based architectures. The terms "image generator" and "image generation model" are used equivalently herein to refer to generative image models.

The term "loss function" as used herein refers, according to some embodiments, to mathematical functions that are used in the training of generative image models. These functions quantify the discrepancy between the model's predictions and the ground truth to guide the optimization process, enabling the trained model to generate realistic and diverse samples. Examples of loss functions for generative image models include, but are not limited to, mean squared error (MSE), cross-entropy, Wasserstein distance, and Kullback-Leibler (KL) divergence. By optimizing model parameters based on these loss functions, the model can generate images that align with real data, improving the model's ability to create realistic and high-quality images in generative AI applications.

The term "reconstruction loss" may be equivalently used herein to refer to the discrepancy between the model's predictions and the ground truth during a single iteration of the training process.

The term "optimization loss" as used herein refers, according to some embodiments, to an overall objective of minimizing the discrepancy being measured by the loss function to improve the model's performance. In other words, the loss function evaluates individual predictions and guiding model adjustments, and the optimization loss seeks to minimize error across the entire training dataset, by iteratively adjusting model parameters during training.

Some embodiments provide a technique to train an AI-based image generator with integrated image moderation to avoid generating certain content. Training images may be annotated with moderation labels, so that during training, the image generation model may be conditioned to a textual or visual prompt, and also conditioned to the moderation labels. By conditioning the model to the moderation label annotations, the image generation model learns to fulfill the input moderation labels and avoid certain types of content when generating an image.

During inference, one or more of the desired moderation labels may be specified along with the prompt so that the output avoids all moderation classes, only one, or any combination thereof. The base generative model may be any type of generative image model.

In some embodiments, image moderation labels may include, but are not limited to, sex, nudity, violence, gambling, obscenities, drugs, adult content, smoking, alcohol, and the like. In some embodiments, image moderation labels may include but are not limited to particular types of religious content, particular types of political content, hate, racism, prejudice, and the like.

In some embodiments, the image moderation labels may include "nudity," "sex," or equivalent label, which may refer to images containing explicit nudity, exposed male and/or female genitalia, sexual activity, and the like.

In some embodiments, the image moderation labels may include a "non-explicit" (or equivalent) label, which may refer to images containing non-explicit nudity, obstructed intimate parts, implied nudity, bare back, and the like.

In some embodiments, the image moderation labels may include a "underwear" (or equivalent) label, which may refer to images containing female swimwear, female underwear, male swimwear, male underwear, and the like.

In some embodiments, the image moderation labels may include a "violence" (or equivalent) label, which may refer to images containing weapons, graphic violence, physical violence, self-harm, blood and gore, explosions, blasts, and the like.

In some embodiments, the image moderation labels may include a "visually disturbing" (or equivalent) label, which may refer to images containing death, illness, emaciation, emaciated bodies, corpses, crashes, and the like.

In some embodiments, the image moderation labels may include a "drugs" (or equivalent) label, which may refer to images containing products, pills, drug paraphernalia, drug use, and the like.

In some embodiments, the image moderation labels may include a "smoking" (or equivalent) label, which may refer to images containing tobacco, cigarettes, vaping, smoking paraphernalia, smoking, and the like.

In some embodiments, the image moderation labels may include an "alcohol" (or equivalent) label, which may refer to images containing alcohol use, drinking, alcoholic beverages, and the like.

In some embodiments, the image moderation labels may include a "hate" (or equivalent) label, which may refer to images containing hate symbols, white supremacy, political and/or religious extremism, and the like.

FIG. 1 illustrates a network architecture 100 used to generative image model training, according to some embodiments. The network architecture 100 may include servers 130 and a database 152, communicatively coupled with multiple client devices 110 via a network 150. Client devices 110 may include, but are not limited to, laptop computers, desktop computers, and the like, and/or mobile devices such as smart phones, palm devices, video players, headsets, tablet devices, and the like.

The network 150 may include, for example, any one or more of a local area network (LAN), a wide area network (WAN), the Internet, and the like. Further, the network 150 may include, but is not limited to, any one or more of the following network topologies, including a bus network, a star network, a ring network, a mesh network, a star-bus network, tree or hierarchical network, and the like.

Figure 2:
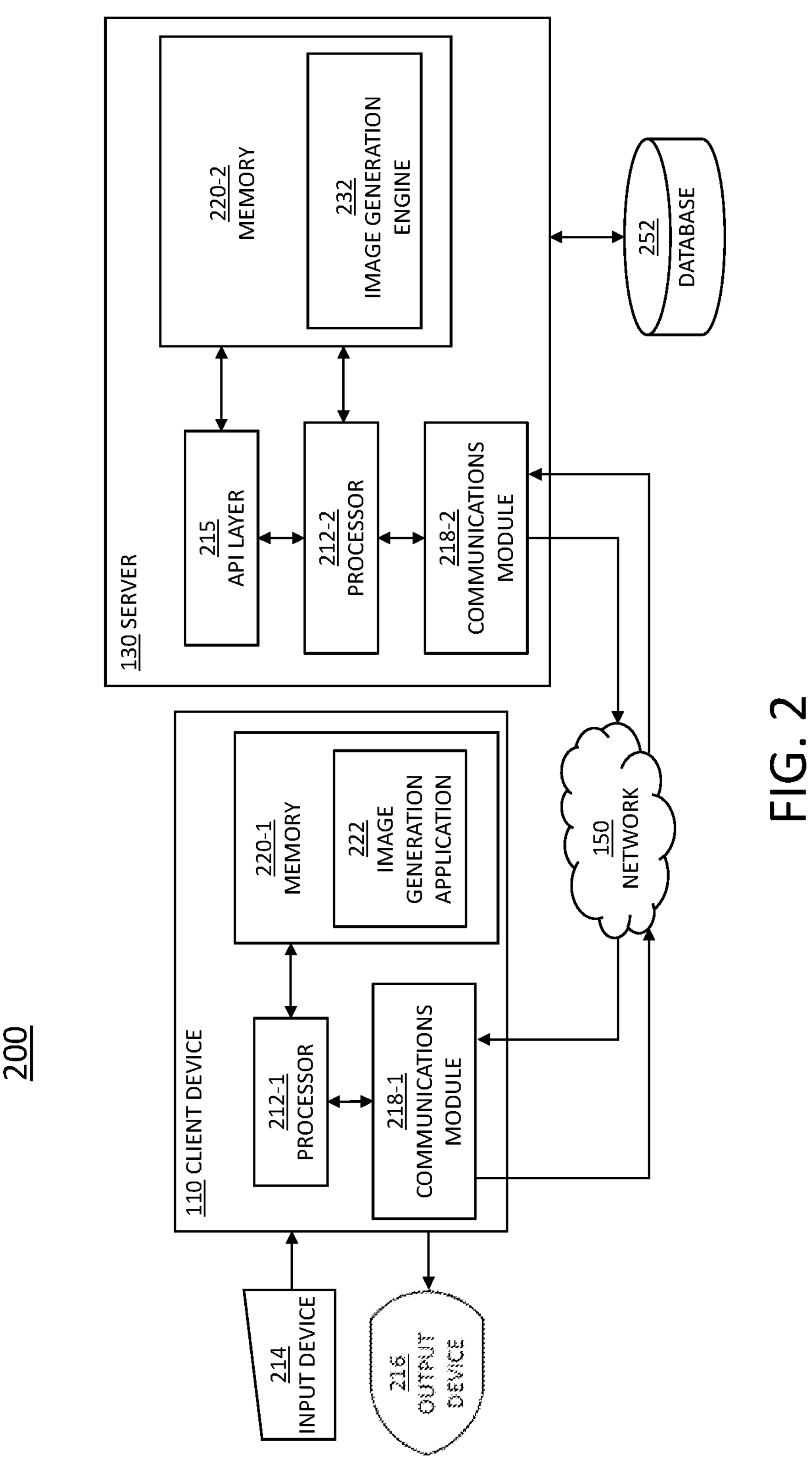
FIG. 2 is a block diagram illustrating details of a system for generative image model training, according to some embodiments.

FIG. 2 is a block diagram illustrating details of a system 200 for generative image model training, having at least one client device 110, at least one server 130, and a network architecture 100 as disclosed herein, according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as requests, uploads, messages, and commands to other devices on the network 150. Communications modules 218 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). Client device 110 may be coupled with an input device 214 and with an output device 216. A user may interact with client device 110 via the input device 214 and the output device 216. Input device 214 may include a mouse, a keyboard, a pointer, a touchscreen, a microphone, a joystick, a virtual joystick, a touch-screen display that a user may use to interact with client device 110, or the like. In some embodiments, input device 214 may include cameras, microphones, and sensors, such as touch sensors, acoustic sensors, inertial motion units and other sensors configured to provide input data to a VR/AR headset. Output device 216 may be a screen display, a touchscreen, a speaker, and the like.

Client device 110 may also include a processor 212-1, configured to execute instructions stored in a memory 220-1, and to cause client device 110 to perform at least some operations in methods consistent with the present disclosure. Memory 220-1 may further include an image generation application 222, configured to run in client device 110 and couple with input device 214 and output device 216. The image generation application 222 may be downloaded by the user from server 130, and/or may be hosted by server 130. The image generation application 222 includes specific instructions which, when executed by processor 212-1, cause operations to be performed according to methods described herein. In some embodiments, the image generation application 222 runs on an operating system (OS) installed in client device 110. In some embodiments, image generation application 222 may run within a web browser. In some embodiments, the processor 212-1 is configured to control a graphical user interface (GUI) for the user of one of client devices 110 accessing the server 130.

Database 152 may store data and files associated with the server 130 from the image generation application 222. In some embodiments, client device 110 collects data, including but not limited to video and images, for upload to server 130 using image generation application 222, to store in the database 152.

Server 130 includes a memory 220-2, a processor 212-2, and communications module 218-2. Processor 212-2 may communicate with memory 220-2 directly or through an API layer 215. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes an image generation engine 232. The image generation engine 232 may be configured to perform operations and methods according to aspects of embodiments. The image generation engine 232 may share or provide features and resources with the client device, including multiple tools associated with data, image, video collection, capture, or applications that use data, images, or video retrieved with image generation engine 232 (e.g., image generation application 222). The user may access the image generation engine 232 through the image generation application 222, installed in a memory 220-1 of client device 110. Accordingly, image generation application 222 may be installed by server 130 and perform scripts and other routines provided by server 130 through any one of multiple tools. Execution of image generation application 222 may be controlled by processor 212-1.

Figure 3:
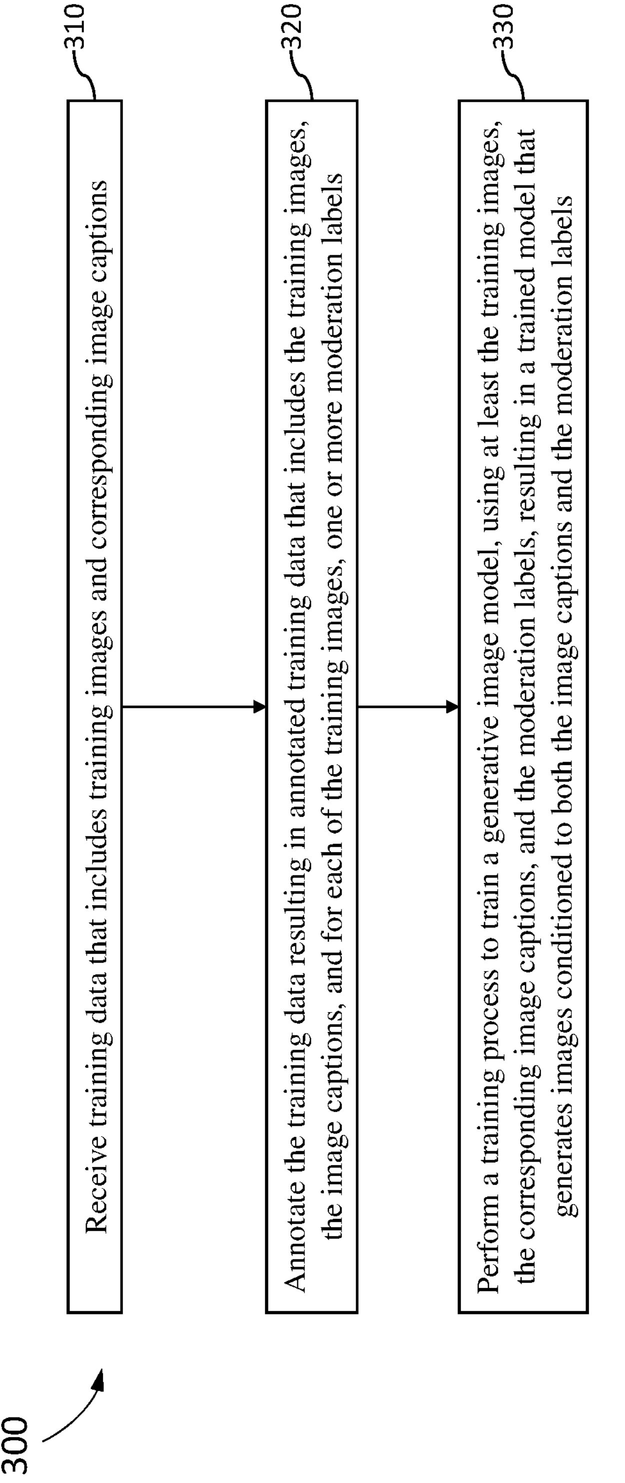
FIG. 3 is a flowchart illustrating a process for training a generative image model, according to some embodiments.

FIG. 3 is a flowchart illustrating a process 300 for training a generative image model performed by a client device (e.g., client device 110, etc.) and/or a client server (e.g., server 130, etc.), according to some embodiments. One or more operations in process 300 may be performed by a processor circuit (e.g., processors 212, etc.) executing instructions stored in a memory circuit (e.g., memories 220, etc.) of a system (e.g., system 200, etc.) as disclosed herein. For example, operations in process 300 may be performed by image generation application 222, image generation engine 232, or some combination thereof. Moreover, a process consistent with this disclosure may include at least operations in process 300 performed in a different order, simultaneously, quasi-simultaneously, or overlapping in time.

Figure 4A:
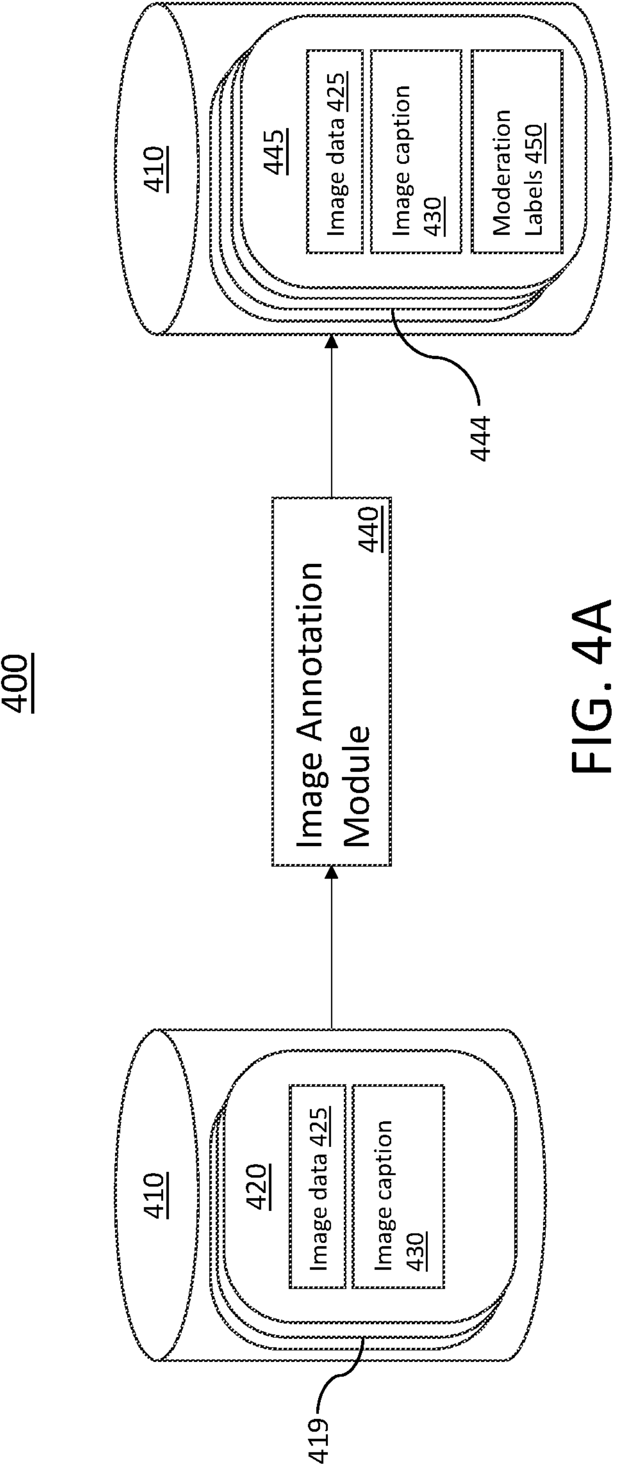
FIG. 4A shows an annotation pipeline of a system for annotating training images with moderation labels.
Figure 4B:
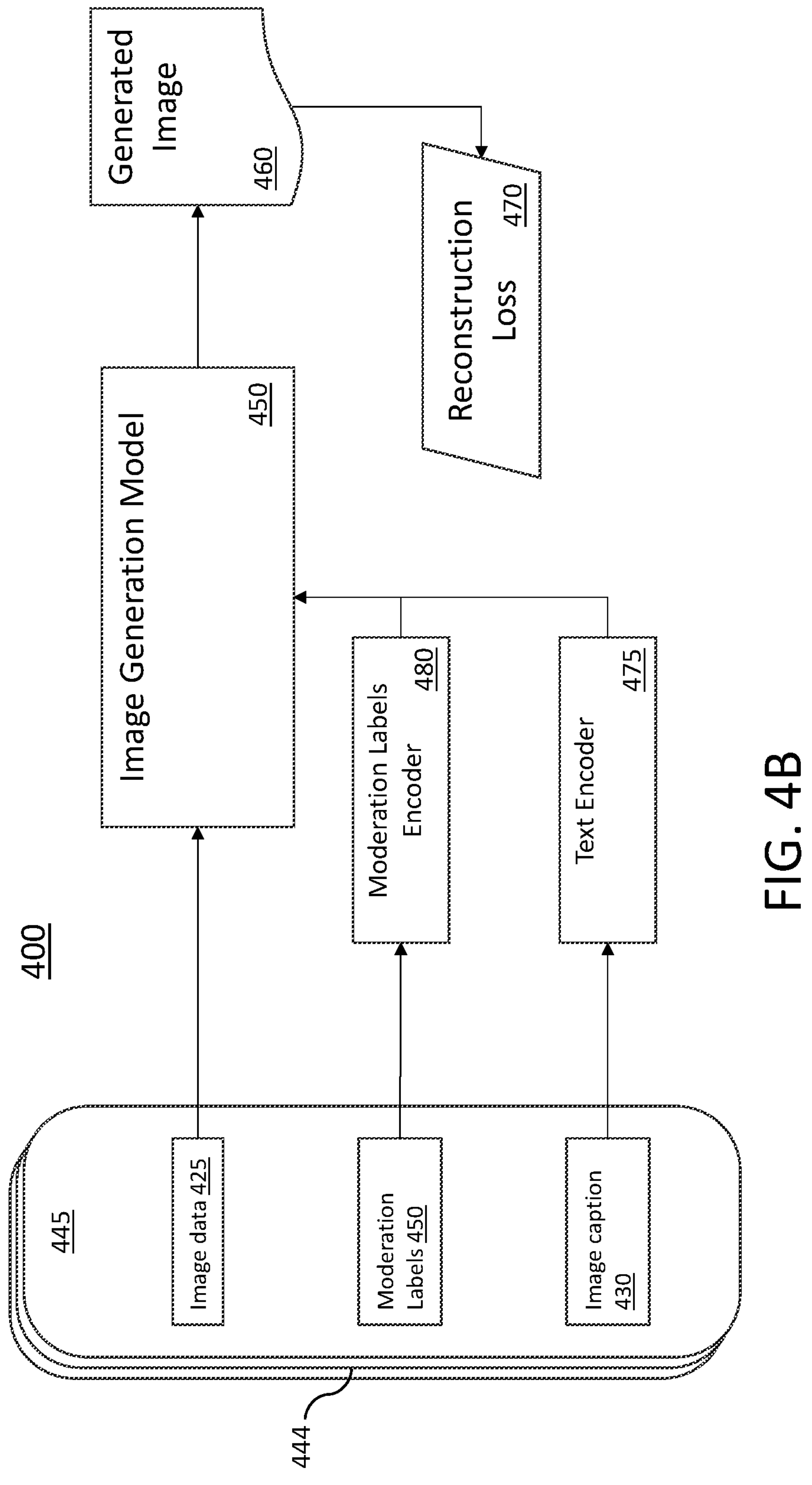
FIG. 4B shows a training pipeline of the system shown in FIG. 4A, using the image moderation labels, according to some embodiments.

The process 300 will be further described with reference to the examples of FIG. 4A and FIG. 4B. FIG. 4A shows an annotation pipeline of a system 400 for annotating training images with moderation labels. FIG. 4B shows a training pipeline of the system 400 for training an image generation model using the image moderation labels, according to some embodiments.

At 310, the process 300 receives training data that includes training images and corresponding image captions. In the example of FIG. 4A, a training data set 410 is shown, that includes a set of training images 419, of which a sample training image 420 is shown in more detail. The training image 420 includes image data 425 and an associated image caption 430.

At 320, the process 300 annotates the training data, resulting in annotated training data that includes the training images, the image captions, and for each of the training images, one or more moderation labels. In the example of FIG. 4A, an image annotation module 440 of the system 400 (e.g., a component or module of server 130, residing in memory 220-2, according to some embodiments) performs the annotation of the training images 419 in the training data set 410, resulting in a set of annotated training images 444, of which a sample of an annotated training image 445 is shown in more detail. The annotated training image 445 includes the same image data 425 and image caption 430 and the pre-annotation training image 420, and further includes at least moderation label 450. The annotated training image 420 may include more than one moderation label (not shown in FIG. 4A).

In the example of FIG. 4A, the image caption 430 and the moderation label 450 are stored as metadata tags (e.g., as entries within a header structure) of the annotated training image 445. Alternatively, image captions and moderation labels may be stored in a database (e.g., database 252, according to some embodiments) and associated with the annotated training image 445.

In some embodiments, the moderation labels may be pre-defined. For example, the moderation labels may be defined using a taxonomy with one or multiple levels of granularity or hierarchy. The moderation labels may include, but are not limited to, sex, nudity, violence, gambling, obscenities, drugs, adult content, smoking, alcohol, hate, and racism. Additional examples of moderation labels are described above.

In some embodiments, the image annotation module 440 may annotate each of the training images 419 using a manual process, e.g., by providing a user interface to a person for reviewing each training image 419 and selecting one or more moderation labels to apply thereto. In other embodiments, the image annotation module 440 may use an automated or semi-automated process that includes providing the training images 419 to an image classifier (not shown), that returns one or more moderation labels associated with each training image. The image classifier may be a sub-module of the image annotation module 440, a separate process executing on a same server 130 (e.g., executing within memory 220-2, according to some embodiments), or may be an external service accessed via an Application Programming Interface (API), a remote procedure call (RPC), or the like.

At 330, the process 300 performs a training process to train a generative image model, using at least the annotated training images, resulting in a trained model that generates images conditioned to both the image captions and the moderation labels. The generative image model may be any type of generative model, including but not limited to a Generative Adversarial Network (GAN), a Variational Autoencoder (VAE), an autoregressive model, a diffusion model, a transformer-based architecture, and the like.

In the example of FIG. 4B, annotated training images 444 are used to train image generation model 450. The example of annotated training image 445 is shown, with its image data 425, the corresponding moderation labels 450, and the corresponding image caption 430 being provided as separate training inputs to the image generation model 450. Using these training inputs, the image generation model 450 outputs one or more generated images 460, which are then compared to the ground truth images (e.g., image data 425) using a loss function (not shown). A reconstruction loss 470 is computed using the loss function and used to optimize the variables of the image generation model 450. The reconstruction loss 470 may be calculated by various methods corresponding to the image generation model 450, including but not limited to image subtraction in pixel space, a vector difference in a vector representation space, and a matrix difference. The training process optimizes the image generation model 450 to generate target images based on both an image prompt (corresponding to the image captions) and desired moderation mode (corresponding to the moderation labels).

The conditioning to the image caption and the moderation labels may be implemented in a number of different ways. This additional information (may need to be encoded and/or embedded so that it can be consumed by the image generation model being trained. In some embodiments, as illustrated with the example of FIG. 4B, the image caption may be encoded using a text encoder 475, and the moderation labels are separately encoded by a moderation labels encoder 480. Therefore, the image generation model may receive two separate inputs, one for each conditioning type, as shown in FIG. 4B. In other embodiments, a single encoder may be used to encode the image caption and the moderation labels, either separately as different inputs, or by combining the image caption and moderation labels as a single input.

Figure 5:
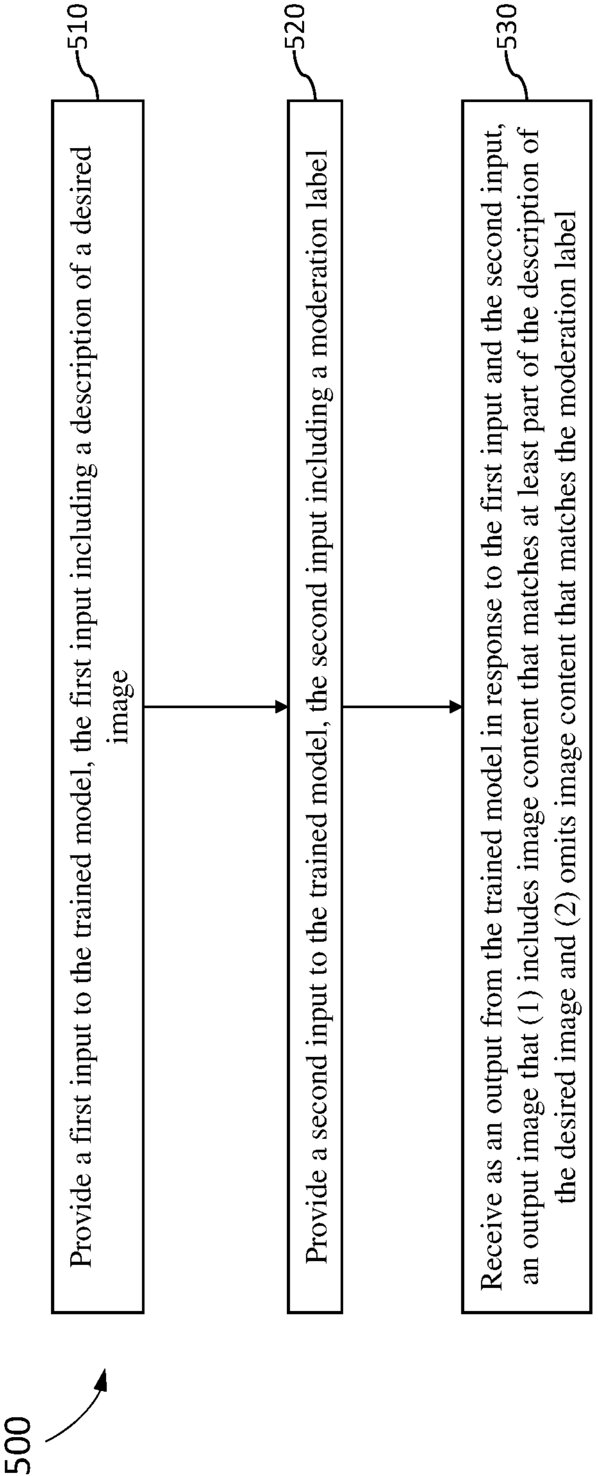
FIG. 5 is a flowchart illustrating a process for inference using a moderated image generation model.

FIG. 5 is a flowchart illustrating a process 500 for inference using a moderated image generation model, performed by a client device (e.g., client device 110, etc.) and/or a client server (e.g., server 130, etc.), according to some embodiments. One or more operations in process 500 may be performed by a processor circuit (e.g., processors 212, etc.) executing instructions stored in a memory circuit (e.g., memories 220, etc.) of a system (e.g., system 200, etc.) as disclosed herein. For example, operations in process 500 may be performed by image generation application 222, image generation engine 232, or some combination thereof. Moreover, a process consistent with this disclosure may include at least operations in process 500 performed in a different order, simultaneously, quasi-simultaneously, or overlapping in time.

At 510, the process 300 provides a first input to the trained model, the first input including a description of a desired image.

At 520, the process 300 provides a second input to the trained model, the second input including a desired moderation mode. The desired moderation mode may directly contradict the prompt. The moderation mode may be set by a user or be fixed beforehand and internally beyond the user's control. The moderation mode may include any combination of moderation labels.

At 530, the process 300 receives as an output from the trained model in response to the first input and the second input, an output image that (1) includes image content that matches at least part of the description of the desired image and (2) omits image content that matches the moderation label. Some non-limiting examples are provided below with reference to FIG. 6 and FIG. 7.

Figure 6:
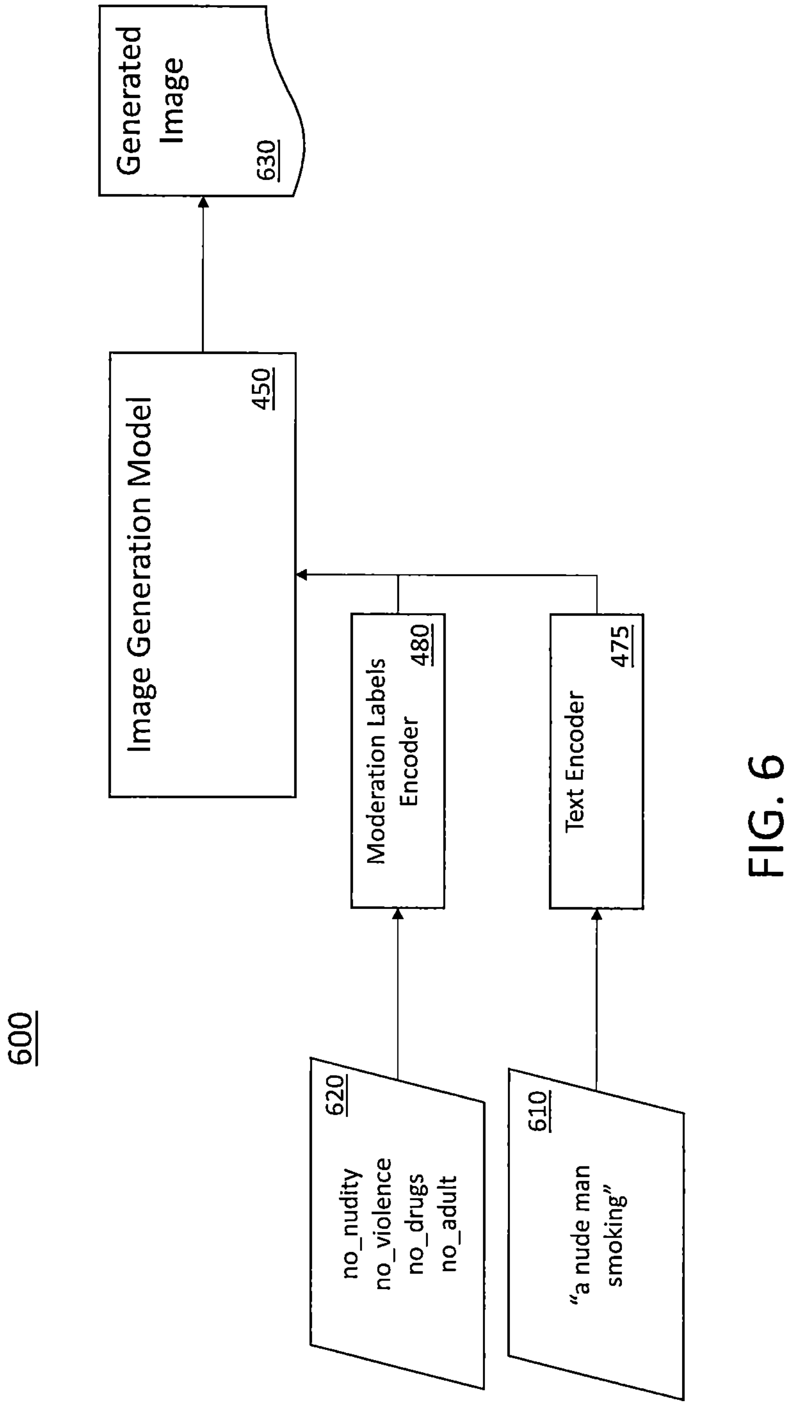
FIG. 6 shows a system for inference using a moderated image generation model, according to some embodiments.

FIG. 6 shows a system 600 for inference using a moderated image generation model, according to some embodiments. The system 600 may include, for example, the system 400 shown in FIGS. 4A and 4B. In this example, the prompt 610 is "a nude man smoking" and the moderation modes 620 specify no nudity, violence, drugs, or adult content. The prompt 610 is encoded by the text encoder 475 and the moderation mode 620 is encoded by the moderation labels encoder 480, and these encoded inputs are provided separately to the trained image generation model 450. In other embodiments, the prompt 610 and the moderation modes 620 may be combined into a single input, either before or after encoding, and provided to the image generation model 450.

The image generation model, being conditioned to both the image captions and the moderation labels during training (e.g., as described above with reference to FIG. 4B), generates an output image 630 of a man who is not nude and who is not smoking, since nudity and drugs were blocked during specification of the moderation mode. In this example, multiple moderation modes 620 were specified, and these override the prompt 610 regardless of how the prompt may be engineered.

Figure 7:
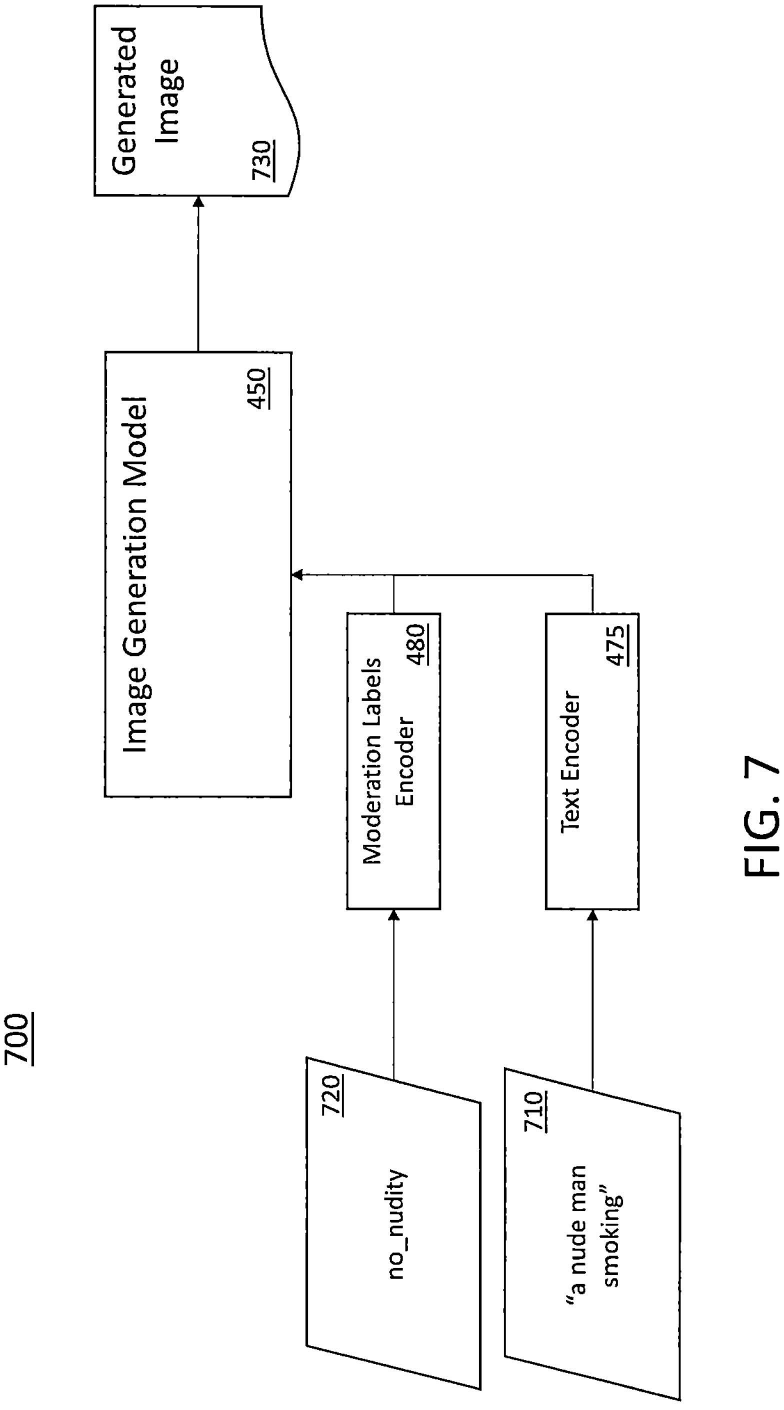
FIG. 7 shows a system for inference using a moderated image generation model, according to some embodiments.

FIG. 7 shows a system 700 for inference using a moderated image generation model, according to some embodiments. The system 700 may include, for example, the system 400 shown in FIGS. 4A and 4B. In this example, the prompt 710 is "a nude man smoking" and the moderation mode 720 specifies no nudity. The prompt 710 is encoded by the text encoder 475 and the moderation mode 720 is encoded by the moderation labels encoder 480, and these encoded inputs are provided separately to the trained image generation model 450. In other embodiments, the prompt 710 and the moderation mode 720 may be combined into a single input, either before or after encoding, and provided to the image generation model 450.

The image generation model, being conditioned to both the image captions and the moderation labels during training (e.g., as described above with reference to FIG. 4B), generates an output image 730 of a man who is not nude, but who is smoking unlike the example described above in FIG. 6, since only nudity was blocked during specification of the moderation mode. In this example, a single moderation mode 720 were specified, and overrides the prompt 710 regardless of how the prompt may be engineered.

In some embodiments, the trained model (being conditioned to both the image captions and the moderation labels during training) may be used to generate content in different moderation modes which can be selected by a user or specified in the background. Some embodiments may apply to video generation models as well as image generation, by applying the moderation to individual image frames or a generated video as a whole. For example, a video on demand service may use the trained model to select different viewing modes (e.g., "adult," "kids," "PG-13,", and the like) and generate video according to these definitions. The moderation may be personalized to a user by selecting preferences (e.g., content preferences, genres, themes, etc.) and used to generate customized video according to those preferences.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A method for training a generative image model, comprising:

receiving training data comprising a plurality of training images and a plurality of image captions;

annotating the training data resulting in annotated training data comprising the plurality of training images, the plurality of image captions, and a plurality of moderation labels, wherein each training image is associated in the annotated training data with a corresponding image caption and at least one corresponding moderation label; and performing a training process to train a generative image model using the plurality of training images, the plurality of image captions, and the plurality of moderation labels, resulting in a trained model that generates images conditioned to both the plurality of image captions and the plurality of moderation labels, wherein each moderation label in the plurality of moderation labels is a word or a phrase.

2. The method of claim 1, wherein a contribution of each training image to an optimization loss of the training process is based on the corresponding image caption and the at least one corresponding moderation label.

3. The method of claim 1, wherein each training image in the plurality of training images comprises the corresponding image caption stored as a metadata tag.

4. The method of claim 1, wherein each training image in the plurality of training images comprises the corresponding moderation label stored as a metadata tag.

5. The method of claim 1, wherein the generative image model is one of a Generative Adversarial Network (GAN), a Variational Autoencoder (VAE), an autoregressive model, a diffusion model, and a transformer-based architecture.

6. The method of claim 1, wherein the moderation labels comprise a plurality of labels, each label uniquely defining one of a plurality of moderation categories, the plurality of moderation categories comprising sex, nudity, violence, gambling, obscenities, drugs, adult content, smoking, alcohol, hate, and racism.

7. The method of claim 1, wherein each training image in the plurality of training images is manually annotated with the moderation labels by a person.

8. The method of claim 1, wherein each training image in the plurality of training images is automatically annotated with the moderation labels by an annotation process.

9. The method of claim 8, wherein the annotation process comprises a call to an application programming interface of a moderation service.

10. The method of claim 1, further comprising:

providing a first input to the trained model, the first input comprising a description of a desired image;

providing a second input to the trained model, the second input comprising a moderation label; and receiving as an output from the trained model in response to the first input and the second input, an output image that (1) comprises image content that matches at least part of the description of the desired image and (2) omits image content that matches the moderation label.

11. A non-transitory computer-readable medium storing a program for training a generative image model, which when executed by a computer, configures the computer to:

receive training data comprising a plurality of training images and a plurality of image captions;

annotate the training data resulting in annotated training data comprising the plurality of training images, the plurality of image captions, and a plurality of moderation labels, wherein each training image is associated in the annotated training data with a corresponding image caption and at least one corresponding moderation label; and perform a training process to train a generative image model using the plurality of training images, the plurality of image captions, and the plurality of moderation labels, resulting in a trained model that generates images conditioned to both the plurality of image captions and the plurality of moderation labels, wherein each moderation label in the plurality of moderation labels is a word or a phrase.

12. The non-transitory computer-readable medium of claim 11, wherein a contribution of each training image to an optimization loss of the training process is based on the corresponding image caption and the at least one corresponding moderation label.

13. The non-transitory computer-readable medium of claim 11, wherein each training image in the plurality of training images comprises the corresponding image caption stored as a first metadata tag, and each training image in the plurality of training images further comprises the corresponding moderation label stored as a second metadata tag.

14. The non-transitory computer-readable medium of claim 11, wherein the generative image model is one of a Generative Adversarial Network (GAN), a Variational Autoencoder (VAE), an autoregressive model, a diffusion model, and a transformer-based architecture.

15. The non-transitory computer-readable medium of claim 11, wherein the moderation labels comprise a plurality of labels, each label uniquely defining one of a plurality of moderation categories, the plurality of moderation categories comprising sex, nudity, violence, gambling, obscenities, drugs, adult content, smoking, alcohol, hate, and racism.

16. The non-transitory computer-readable medium of claim 11, wherein each training image in the plurality of training images is manually annotated with the moderation labels by a person.

17. The non-transitory computer-readable medium of claim 11, wherein each training image in the plurality of training images is automatically annotated with the moderation labels by an annotation process.

18. The non-transitory computer-readable medium of claim 17, wherein the annotation process comprises a call to an application programming interface of a moderation service.

19. The non-transitory computer-readable medium of claim 11, wherein the program, when executed by the computer, further configures the computer to:

provide a first input to the trained model, the first input comprising a description of a desired image;

provide a second input to the trained model, the second input comprising a moderation label; and receive as an output from the trained model in response to the first input and the second input, an output image that (1) comprises image content that matches at least part of the description of the desired image and (2) omits image content that matches the moderation label.

20. A system for training a generative image model, comprising:

a processor; and a non-transitory computer readable medium storing a set of instructions, which when executed by the processor, configure the processor to:

receive training data comprising a plurality of training images and a plurality of image captions;

annotate the training data resulting in annotated training data comprising the plurality of training images, the plurality of image captions, and a plurality of moderation labels, wherein each training image is associated in the annotated training data with a corresponding image caption and at least one corresponding moderation label;

perform a training process to train a generative image model using the plurality of training images, the plurality of image captions, and the plurality of moderation labels, resulting in a trained model that generates images conditioned to both the plurality of image captions and the plurality of moderation labels;

provide a first input to the trained model, the first input comprising a description of a desired image;

provide a second input to the trained model, the second input comprising a moderation label; and receive as an output from the trained model in response to the first input and the second input, an output image that (1) comprises image content that matches at least part of the description of the desired image and (2) omits image content that matches the moderation label, wherein each moderation label in the plurality of moderation labels is a word or a phrase.

* * * * *